(12) United States Patent
Nabeta (10) Patent No.: US 7,954,956 B2
(45) Date of Patent: Jun. 7, 2011

(54) PROJECTION-TYPE DISPLAY APPARATUS

(75) Inventor: Noboru Nabeta, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 587 days.

(21) Appl. No.: 12/042,645

(22) Filed: Mar. 5, 2008

(65) Prior Publication Data

US 2008/0231811 A1    Sep. 25, 2008

(30) Foreign Application Priority Data

Mar. 20, 2007   (JP) .................................. 2007-072097

(51) Int. Cl.
*G03B 21/26* (2006.01)
*G03B 21/20* (2006.01)
*G03B 21/18* (2006.01)
*G03B 21/16* (2006.01)
*H04N 5/74* (2006.01)

(52) U.S. Cl. ................. 353/57; 353/85; 353/52; 353/60; 348/748

(58) Field of Classification Search ..................... 353/57, 353/85, 52, 60; 348/748
See application file for complete search history.

(56) References Cited

U.S. PATENT DOCUMENTS

| | | | |
|---|---|---|---|
| 6,626,541 B2 | 9/2003 | Sunaga | |
| 6,702,444 B2 * | 3/2004 | Takizawa et al. | 353/52 |
| 6,886,942 B2 * | 5/2005 | Okada et al. | 353/52 |
| 7,131,731 B2 | 11/2006 | Oketani | 353/57 |
| 7,606,640 B2 * | 10/2009 | Hirai et al. | 700/300 |

FOREIGN PATENT DOCUMENTS

| | | | |
|---|---|---|---|
| JP | 63284501 A | * | 11/1988 |
| JP | 5-061746 | | 8/1993 |
| JP | 8-234155 | | 9/1996 |
| JP | 2000-352708 | | 12/2000 |
| JP | 2001-255462 | | 9/2001 |
| JP | 2003-005146 | | 1/2003 |
| JP | 2003-107582 | | 4/2003 |
| JP | 2004-012750 | | 1/2004 |
| JP | 2004012750 A | * | 1/2004 |
| JP | 2004-361462 | | 12/2004 |
| JP | 2006-3541 | | 1/2006 |

OTHER PUBLICATIONS

Translation (abstract) of JP 63-284501 A, Atsuta et al., Nov. 21, 1988.*

* cited by examiner

*Primary Examiner* — Georgia Y Epps
*Assistant Examiner* — Magda Cruz
(74) *Attorney, Agent, or Firm* — Fitzpatrick, Cella, Harper & Scinto (57) ABSTRACT

A projection-type display apparatus includes an optical modulation device having a lamp emitting a light, and a projection optical system projecting the light on a screen in a magnified form, with the projection optical system including a plurality of reflection mirrors. In addition, a fan system air-cools reflective surfaces of the plurality of reflection mirrors. The fan system includes a fan and a controller for controlling the fan based on luminance output of the lamp.

6 Claims, 6 Drawing Sheets

PROJECTION-TYPE DISPLAY APPARATUS

BACKGROUND OF THE INVENTION

1. Field of the Invention

The present invention relates to a projection-type display apparatus such as a projector, and more specifically, to cooling of a reflection mirror for image formation of the projection-type display apparatus.

2. Description of the Related Art

Hitherto, for the purpose of reducing the size and thickness of a projection-type display apparatus, a rear projection display using an oblique projection system has been proposed (Japanese Patent Application Laid-Open No. 2001-255462). Specifically, the oblique projection system is a system such that a light projected from a lamp is sequentially reflected by a plurality of reflection mirrors and is projected onto a screen or the like placed ahead of the reflection mirrors. Along with the recent size reduction of an equipment and the increase in definition (display resolution) of an image, the reflection mirror has become an essential part which is required to have a high precision and a factor which may determine the comparative merits of a product.

However, the reflectance of the reflection mirror is not 100%, so that heat is held on a reflective surface of the reflection mirror although it is slight, and a temperature difference is generated between a reflective surface side and a rear surface side of the reflection mirror due to the influence of the heat, which results in a problem that the reflection mirror will be deformed due to a bimetallic effect.

In order to solve the above problem, a technology of sending air to a reflection mirror to thereby cool the reflection mirror with air has been proposed (Japanese Patent Application Laid-Open No. 2006-003541).

For example, in the case of cooling a reflective surface of a reflection mirror with air sent from a cooling fan so as to cool the reflection mirror, there is a problem that when the cooling fan is rotated at a high speed so as to obtain a sufficient cooling effect, the noise increases.

There is also another problem in terms of cost and power consumption, when the number of cooling fans is increased excessively in order that a plurality of cooling fans are rotated at a low speed to reduce the noise.

SUMMARY OF THE INVENTION

An object of the present invention is to provide a projection-type display apparatus which can efficiently cool a reflection mirror with a small number of cooling fans.

The present invention provides a projection-type display apparatus for modulating a projection light from a lamp by an optical modulation device and then projecting the light on a screen in a magnified form by a projection optical system, which has a configuration in which the projection optical system includes at least one reflection mirror, and a reflective surface of the reflection mirror is air-cooled by a cooling fan, wherein an air flow rate of the cooling fan is controlled based on a projection image information.

According to the present invention, the thermal state of a reflection mirror is determined based on a projection image information or an information of a light amount sensor or a temperature sensor, whereby a cooling fan is controlled each time to a necessary minimum air flow rate in real time within an allowable range of image degradation. Therefore, the reflection mirror can be cooled efficiently with a small number of cooling fans.

Further features of the present invention will become apparent from the following description of exemplary embodiments with reference to the attached drawings.

DESCRIPTION OF THE EMBODIMENTS

Hereinafter, embodiments of the projection-type display apparatus according to the present invention will be described with reference to the drawings.

In the figures, there are illustrated a light amount sensor 1, a temperature sensor 2, a cooling (air flow) fan 4, an illumination system optical unit 5, a small reflection mirror 6, a first surface reflection mirror 11, a second surface reflection mirror 12, a third surface reflection mirror 13, a fourth surface reflection mirror 14, a partition plate 21, and a casing 22.

Embodiment 1

Although a detailed illustration is omitted, the projection-type display apparatus of this embodiment modulates a projection light from a lamp of an illumination system optical unit with an optical modulation device as is the case with an ordinary projector, and thereafter, projects the light on a screen with a projection optical system in a magnified form. The projection optical system includes one or more reflection mirrors, and cools a reflective surface of the reflection mirror with air from a cooling fan.

Figure 1:
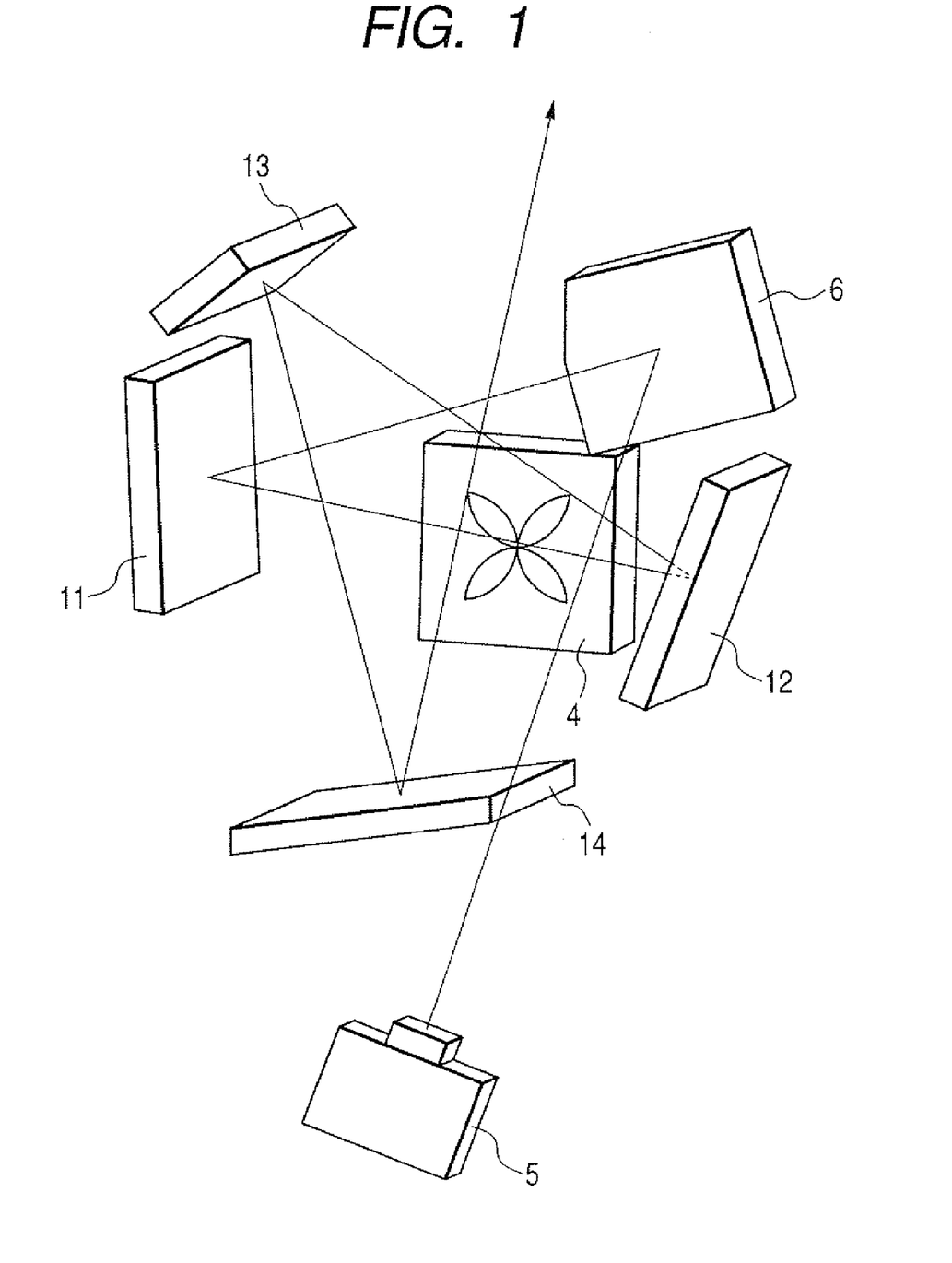
FIG. 1 is a perspective view illustrating a projection-type display apparatus according to Embodiment 1 of the present invention.
Figure 2:
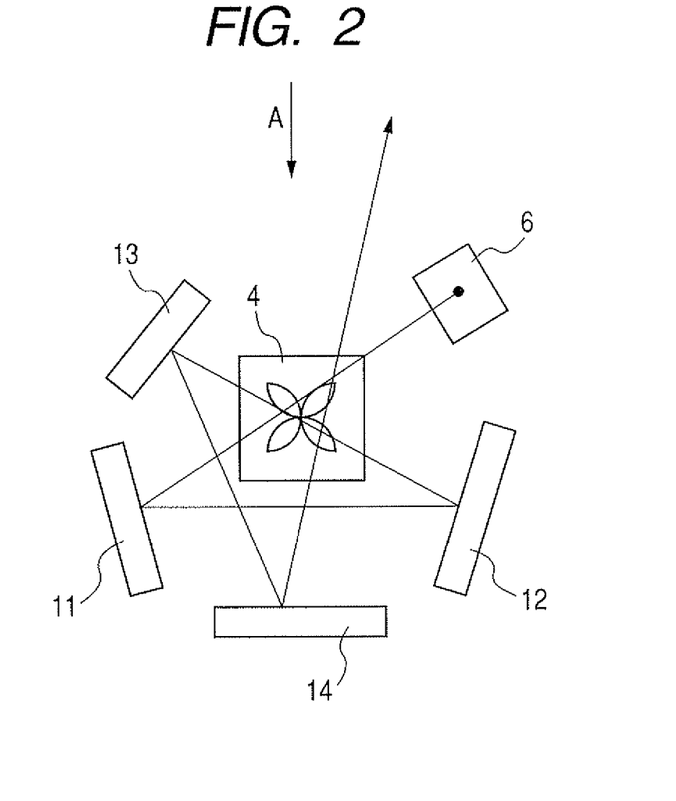
FIG. 2 is a main cross-sectional view illustrating the projection-type display apparatus according to Embodiment 1 of the present invention.
Figure 3:
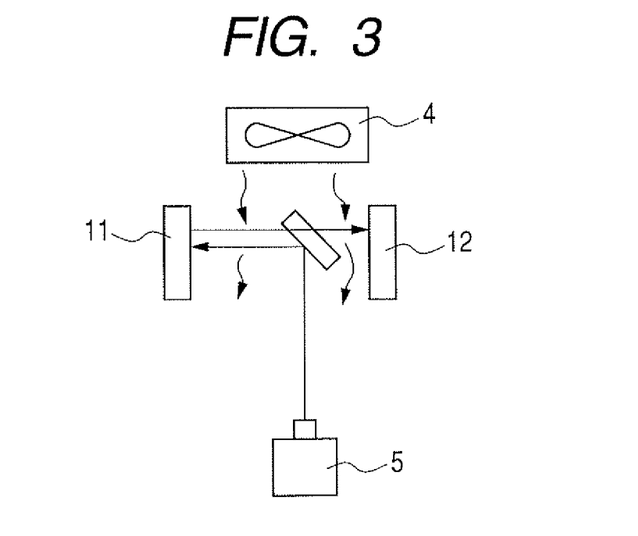
FIG. 3 is a view in the direction of the arrow A in FIG. 2.

More specifically, as illustrated in FIGS. 1 to 3, a light beam from a lamp is guided to the first surface reflection mirror 11 by the small reflection mirror 6 that changes the light traveling direction by about 90° in a horizontal direction. After that, the light beam is sequentially reflected by the second surface reflection mirror 12, the third surface reflection mirror 13, and the fourth surface reflection mirror 14, and projected on a screen or the like placed ahead of those mirrors. A configuration is employed in which the respective reflection mirrors 6 and 11 to 14 are air-cooled by the cooling fan 4 disposed on the side of the reflection mirrors 6 and 11 to 14 so that the reflection mirrors 6 and 11 to 14 are not deformed due to the above-mentioned bimetallic effect caused by heat, and the cooling fan 4 has an air flow rate controlled based on a projection image information.

The cooling fan 4 cannot be rotated lightly at a high speed in the case where low noise is desired. Therefore, the air flow rate of the cooling fan 4 is desired to be minimum "within an allowable range of image degradation." The "allowable range of image degradation" varies greatly depending on the output content (projection image information) of an image. Further, the "remaining heat amount of reflection mirror" also varies greatly depending on the output content.

That is, the output content greatly influences the "allowable range of image degradation" and the "remaining heat amount of reflection mirror." Therefore, it is extremely effective to control the air flow rate of the cooling fan 4 depending on the output content.

Figure 4:
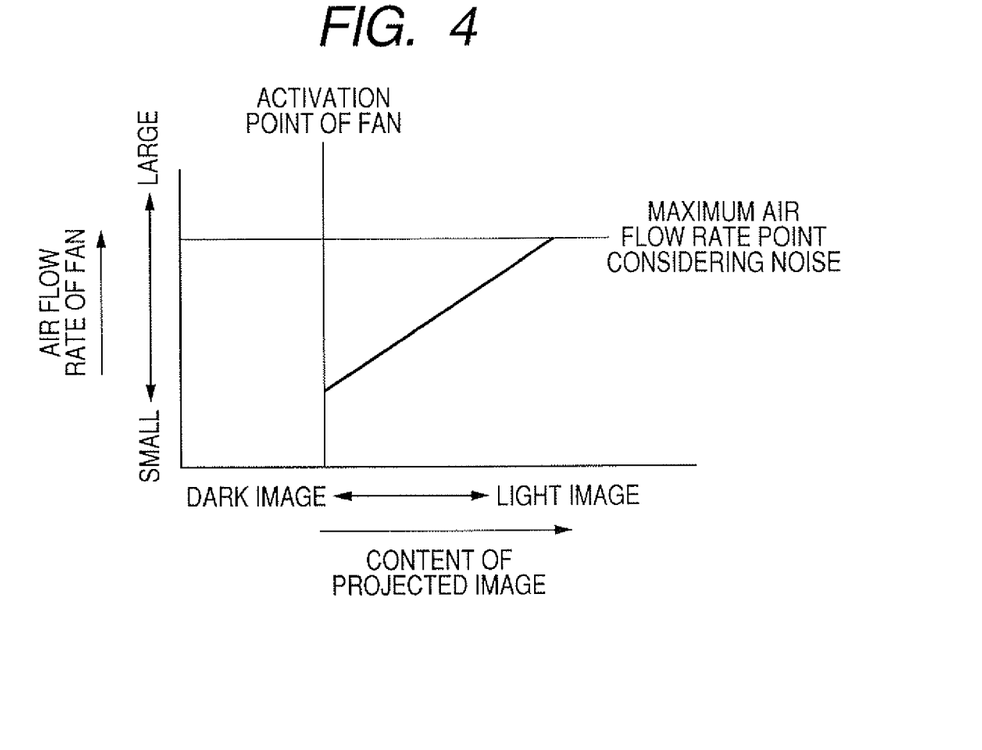
FIG. 4 is a correlation diagram illustrating a relationship between the lightness of an output image and the air flow of a cooling fan.
Figure 5:
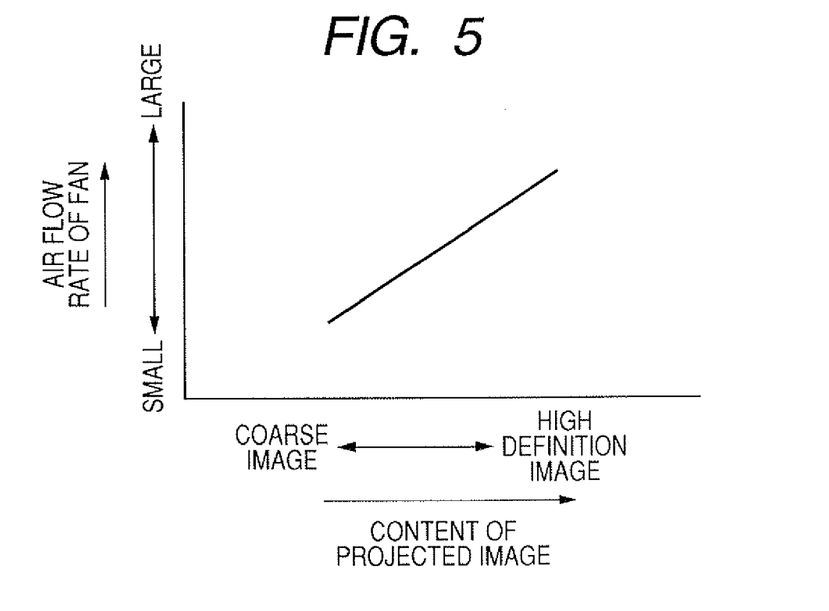
FIG. 5 is a correlation diagram illustrating a relationship between the definition of an output image and the air flow of a cooling fan.

For example, when a graph is plotted with the lightness of an output image as abscissa and the air flow rate of the cooling fan 4 as ordinate, the relationship as illustrated in FIG. 4 is obtained. Further, when a graph is plotted with the definition of an output image as abscissa and the air flow rate of the cooling fan 4 as ordinate, the relationship as illustrated in FIG. 5 is obtained.

More specifically, a minimum point at which the cooling fan 4 does not need to be activated because of heat radiation from a housing body containing the reflection mirrors or the like, and a maximum point at which air may be flowed in consideration of noise are determined in advance. A setting is made such that by controlling the voltage applied to the cooling fan 4 and the like within the thus determined range, optimum air flow can be performed. Incidentally, in the examples illustrated in the figures, the activation point (i.e., minimum point) of the cooling fan 4 is connected linearly to a point of a maximum air flow rate, whereby the air flow rate of the cooling fan 4 is controlled along this line. However, it is to be noted that those points need not be connected linearly, and may be appropriately set in accordance with a display apparatus to which the cooling fan is applied.

The activation point of the cooling fan 4 only needs to be set such that the cooling fan 4 is activated when the allowable range of image degradation is exceeded, based on the above-mentioned output content. On the other hand, the point of the maximum air flow rate of the cooling fan 4 only needs to be set considering noise.

Incidentally, the lightness of an output image and the definition of an output image are each illustrated as a graph in the figures. However, in practice, the activation point of the cooling fan 4 and the point of the maximum air flow rate will be set considering those elements in combination.

Further, when the activation point of the cooling fan 4 and the point of the maximum air flow rate are actually to be set, the design needs to be made in such a way that in a state where maximum degradation of the projection optical performance is probable, if the air flow rate at the time of the point of the maximum air flow rate is available, the performance of the illumination system optical unit 5 is secured. That is, the design needs to be made such that there is no problem in the projection optical performance, by enlarging the cooling fan 4, and the like.

Figure 6:
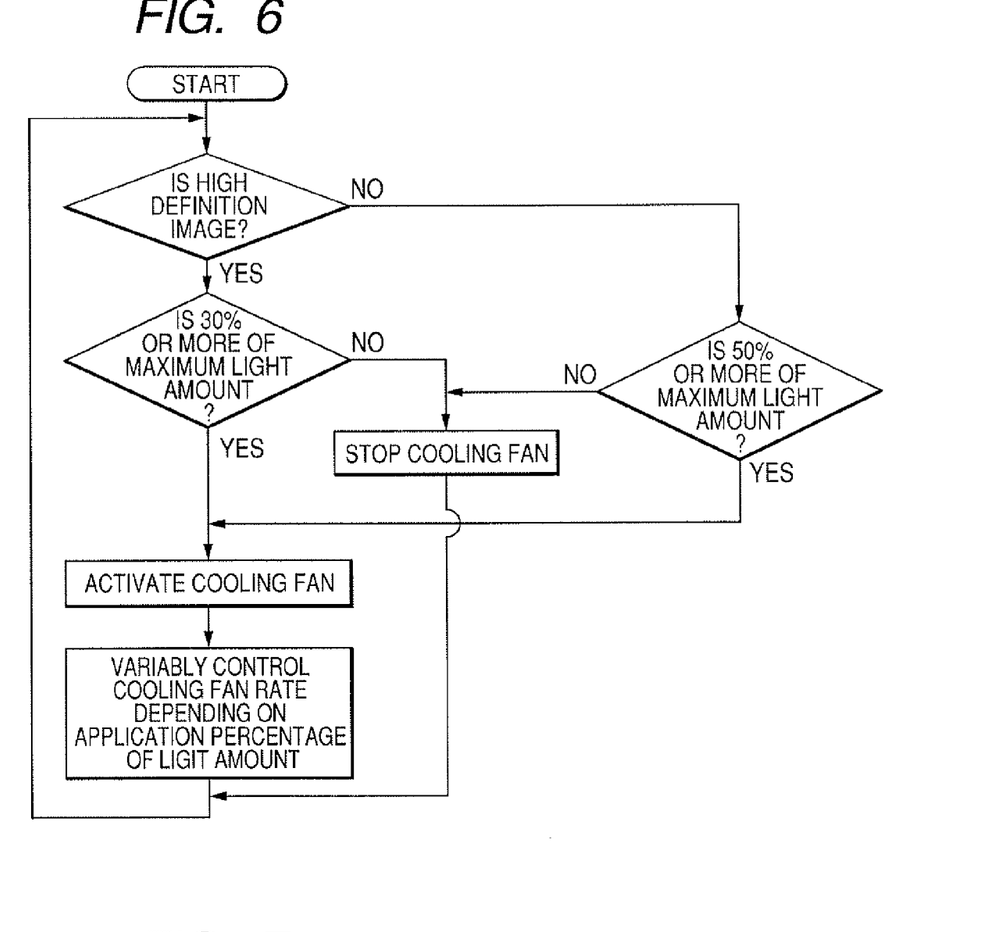
FIG. 6 is a flowchart illustrating a method of controlling a cooling fan.

Hereinafter, the method of controlling the cooling fan 4 will be described with reference to a flowchart illustrated in FIG. 6.

In a case of a high-definition still image, the time at which the available light amount is 30% of the maximum light amount (amount of light produced at the time of irradiation with a maximum luminance) is defined as a lower limit of the allowable range of image degradation, and the cooling fan 4 is activated at that time (i.e., an activation point). Thereafter, the air flow rate of the cooling fan 4 is variably controlled in accordance with the application percentage with respect to the maximum light amount, and the cooling fan 4 is rotated at a maximum speed which is allowable in consideration of noise at the time of 100% of the maximum light amount (that is, the point of a maximum air flow rate). Since the air flow rate of the cooling fan 4 is controlled variably, so that air flow of a necessary minimum flow rate can be used to reduce noise. Incidentally, the term "maximum light amount" herein employed refers to the most severe state in terms of heat with respect to the reflection mirror when a projection image to a projector is formed by a reflection mirror. For example, in a case of an apparatus with a maximum luminance of 500 cd in terms of a catalog value, the maximum light amount represents the state in which 500 cd is output.

On the other hand, in a case of an image such as a motion image (i.e., the allowable limit of image degradation is not so strict as that of a high-definition still image), the time at which the available light amount is 50% of the maximum light amount is defined as a lower limit of the allowable range of image degradation, and the cooling fan 4 is activated at that time (i.e., an activation point) and 50% of a maximum light amount corresponding to the range of allowable image degradation, the cooling fan 4 is activated therein (i.e., an activation point). Incidentally, in the case of an image such as a motion image, the rotation speed of the cooling fan 4 may be lower than that of a high-definition still image even at the time of 100% of the maximum light amount at which the maximum air flow rate is obtained.

In the control of the cooling fan 4, feedback is performed in real time, by basically using a control system (not illustrated), whereby the cooling fan 4 is controlled using a value of a voltage applied to the cooling fan 4 and an ON/OFF duty ratio. At this time, if the cooling fan 4 is controlled using a signal (information) which is in conjunction with the output content of an image, a separate signal processing is not required, which is advantageous in terms of the cost of the electric circuit.

For example, a method which is in conjunction with the control of luminance of a lamp is conceivable. Since the output content of an image is in superior conjunction with the luminance control of a lamp, and since the state of a reflection mirror can be predicted from the state of the luminance control of a lamp based on experimental data, the cooling fan 4 may be controlled based on information of the luminance control of a lamp, which is advantageous.

If there is any element that is in conjunction with the output content of an image, such element may also be used.

In the case where too much feedback is performed in the control of the cooling fan 4 to cause an activation sound of ON/OFF of the cooling fan 4 to be a problem, the interval of the feedback is set appropriately.

The projection-type display apparatus of the above structure determines in what thermal state the reflection mirror is based on the projection image information, and controls the air flow rate of the cooling fan to a necessary minimum amount in real time within the allowable range of image degradation each time. Therefore, the reflection mirror can be cooled efficiently with a small number of cooling fans.

Meanwhile, it is more effective to divide the air flow from the cooling fan 4 into a plurality of streams with an air flow rate distribution controlled in accordance with the influences of the heat of the respective reflection mirrors.

For example, in the case where the first surface reflection mirror 11 is sensitive, an air path is formed so that the flow rate of air to the first surface reflection mirror 11 is increased.

Figure 7:
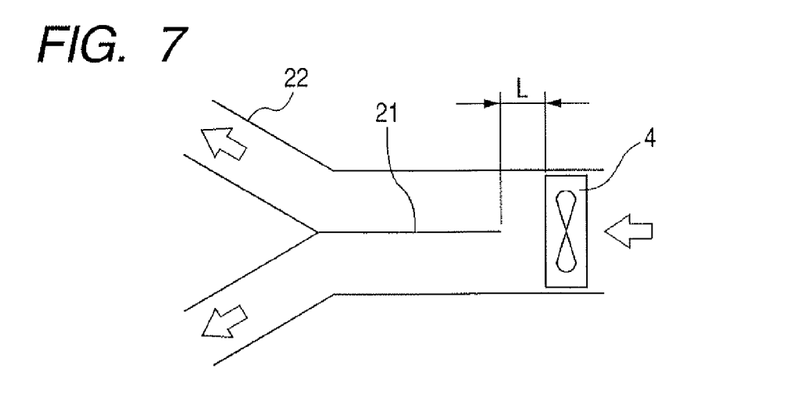
FIG. 7 is a schematic view illustrating an air path formed when flowing air at divided air flow rates of a cooling fan.

That is, by increasing the allocation of air flow to a site having significant image degradation by heat, the rotation number of the cooling fan 4 can be further reduced. Specifically, in the case of dividing a air flow rate of a single cooling fan 4, as illustrated in FIG. 7, the air flow rate may be divided by using a partition plate 21 located in the vicinity of the cooling fan 4 while allowing the air from the cooling fan 4 to flow in a casing 22 having air paths formed therein. The reason for this is that when the partition plate 21 is disposed at a position distant from the cooling fan 4, the air flow loss at a portion for switching the air flow rate increases, with the result that the air flow efficiency is decreased.

However, when the partition plate 21 is located too close to the cooling fan 4, wind noise is generated to cause undesired noise. Therefore, the L size of FIG. 7 may preferably be reduced within a range in which wind noise is not generated, considering the air flow speed of the cooling fan 4.

It is particularly effective to air-cool the reflection mirror as described above in the case where the reflection mirror is made of a resin because the deformation of the reflection mirror by heat is remarkable.

Embodiment 2

Figure 8:
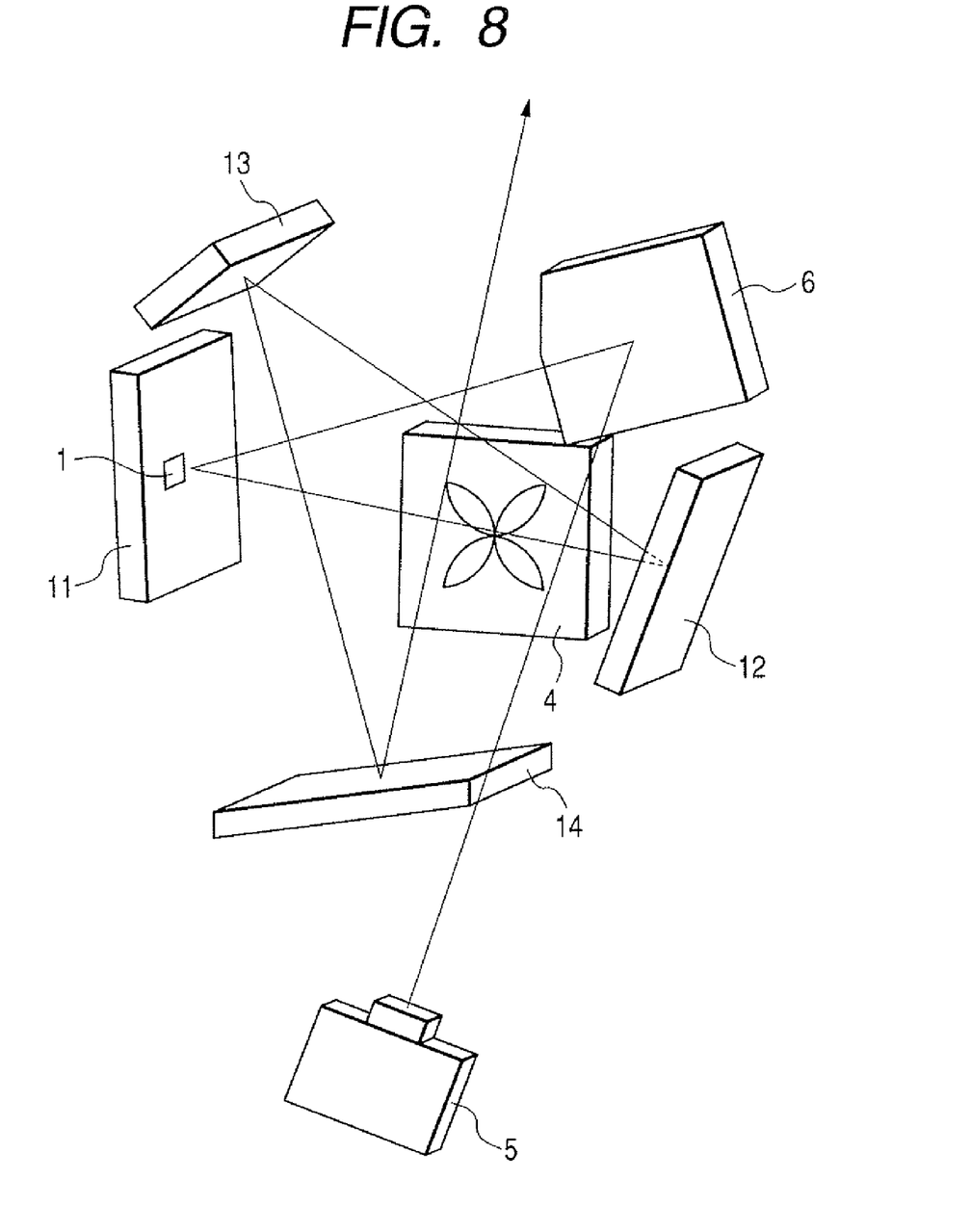
FIG. 8 is a perspective view illustrating a projection-type display apparatus according to Embodiment 2 of the present invention.

As illustrated in FIG. 8, a projection-type display apparatus of this embodiment guides a light beam from a lamp of an illumination system optical unit 5 to the first surface reflection mirror 11 by the small reflection mirror 6 that changes the light traveling direction by about 90° in a horizontal direction. After that, the light beam is sequentially reflected by the second surface reflection mirror 12, the third surface reflection mirror 13, and the fourth surface reflection mirror 14, and projected on a screen (not illustrated) or the like placed ahead of the mirrors. At this time, the respective reflection mirrors 6 and 11 to 14 are air-cooled by the cooling fan 4 placed on the side of the reflection mirrors 6 and 11 to 14 so that the respective reflection mirrors 6 and 11 to 14 are not deformed by the bimetallic effect caused by the influence of heat as described above.

The projection-type display apparatus of Embodiment 1 of the present invention has substantially the same structure as that of the projection-type display apparatus of Embodiment 1 except for information used for controlling the cooling fan 4. More specifically, in the case where the reflection mirror 11 is sensitive, the state of the reflection mirror 11 is important information in terms of the control of the cooling fan 4. Thus, the light amount sensor 1 is disposed to the reflection mirror 11 or in the vicinity of the reflection mirror 11, i.e., within a range of irradiation to the reflection mirror 11, and the cooling fan 4 is controlled based on the information.

The projection-type display apparatus of the above-mentioned structure determines in what thermal state the reflection mirror is based on the information of the light amount sensor, and controls the cooling fan each time to the necessary minimum air flow rate in real time within the allowable range of image degradation. Therefore, the reflection mirror can be cooled efficiently with a small number of cooling fans.

In the case where the reflection mirror is made of a resin, because the reflection mirror is deformed remarkably by heat, the projection-type display apparatus of this embodiment is particularly effective as is the case with Embodiment 1 of the present invention.

Embodiment 3

Figure 9:
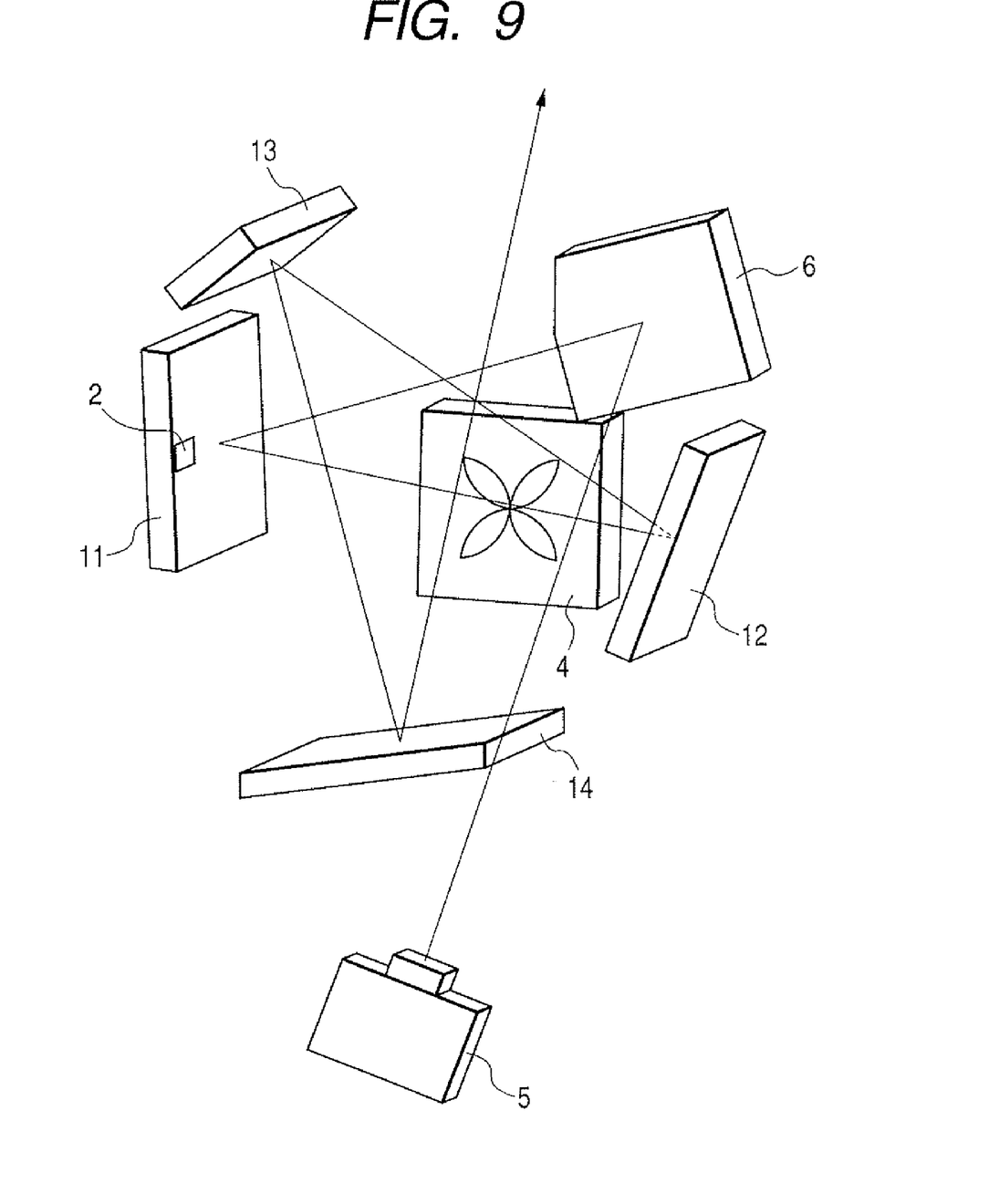
FIG. 9 is a perspective view illustrating a projection-type display apparatus according to Embodiment 3 of the present invention.

As illustrated in FIG. 9, a projection-type display apparatus of this embodiment guides a light beam from the lamp of the illumination system optical unit 5 to the first surface reflection mirror 11 by the small reflection mirror 6 that changes the light traveling direction by about 90° in a horizontal direction. After that, the light beam is sequentially reflected by the second surface reflection mirror 12, the third surface reflection mirror 13, and the fourth surface reflection mirror 14, and projected on a screen (not illustrated) or the like placed ahead of the mirrors. At this time, the respective reflection mirrors 6 and 11 to 14 are air-cooled by the cooling fan 4 disposed on the side of the reflection mirrors 6 and 11 to 14 so that the respective reflection mirrors 6 and 11 to 14 are not deformed by the bimetallic effect caused by the influence of heat as described above.

The projection-type display apparatus of this embodiment has substantially the same structure as those of the projection-type display apparatuses of Embodiments 1 and 2 of the present invention except for information used for controlling the cooling fan 4. More specifically, in the case where the reflection mirror 11 is sensitive, the state of the reflection mirror 11 is important information for controlling the cooling fan 4. The temperature sensor 2 is disposed to the reflection mirror 11 or in the vicinity of the reflection mirror 11, and the cooling fan 4 is controlled based on the information of the temperature sensor 2. At this time, the temperature sensor 2 is preferably disposed downstream in the air flow of the cooling fan 4, whereby the information of the reflection mirror can be grasped more exactly.

The projection-type display apparatus of the above structure determines in what thermal state the reflection mirror is based on the information of the temperature sensor, and controls the cooling fan each time to the necessary minimum air flow rate in real time within the allowable range of image degradation. Therefore, the reflection mirror can be cooled efficiently with a small number of cooling fans.

In the case where the reflection mirror is made of a resin, because the reflection mirror is deformed remarkably by heat, the projection-type display apparatus of this embodiment is particularly effective as is the case with Embodiment 1 of the present invention.

Embodiment 4

Embodiments 1, 2, and 3 of the present invention have been described above. The projection-type display apparatus of Embodiment 2 may be combined with the projection-type display apparatus of Embodiment 3 to obtain information with higher precision, based on which the cooling fan 4 may be controlled.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-072097, filed Mar. 20, 2007 which is hereby incorporated by reference herein in its entirety.

What is claimed is:
1. A projection-type display apparatus, comprising:
an optical modulation device having a lamp emitting a light;
a projection optical system projecting the light on a screen in a magnified form, the projection optical system including a plurality of reflection mirrors; and
a fan system for air-cooling reflective surfaces of the plurality of reflection mirrors, wherein the fan system includes a fan and a controller for controlling the fan based on luminance output of the lamp, and wherein the fan is controlled based on a determination of whether the image is a high definition image or not.

2. The projection-type display apparatus according to claim 1, wherein the reflection mirror is formed of a resin.

3. The projection-type display apparatus according to claim 1, wherein the fan system further comprises an air path divider for dividing the air flow rate of the cooling fan depending on the plurality of reflection mirrors.

4. A projection-type display apparatus, comprising:

an optical modulation device having a lamp emitting a light;

a projection optical system projecting the light on a screen in a magnified form, the projection optical system including a plurality of reflection mirrors and a light amount sensor provided on at least one of the reflection mirrors; and a fan system for air-cooling reflective surfaces of the plurality of reflection mirrors, wherein the fan system includes a fan and a controller for controlling the fan based on the light amount sensor, and wherein the fan is controlled based on a determination of whether the range is a high definition image or not.

5. The projection-type display apparatus according to claim 4, wherein the reflection mirror is formed of a resin.

6. The projection-type display apparatus according to claim 4, wherein the fan system further comprises an air path divider for dividing the air flow rate of the cooling fan depending on the plurality of reflection mirrors.

* * * * *